UNITED STATES PATENT OFFICE.

HERMAN VON UFFEL, OF PHILADELPHIA, PENNSYLVANIA.

FIBER COMPOSITION.

1,326,232.     Specification of Letters Patent.     Patented Dec. 30, 1919.

No Drawing. Application filed October 17, 1916, Serial No. 126,079. Renewed May 2, 1919. Serial No. 294,347.

*To all whom it may concern:*

Be it known that I, HERMAN VON UFFEL, a citizen of the United States, and a resident of Philadelphia, in the county of Philadelphia and State of Pennsylvania, have invented a new and Improved Fiber Composition, of which the following is a full, clear, and exact description.

My invention relates to a fiber composition characterized by its fireproof qualities and its adaptability to be worked into various forms at normal temperature.

The object of the invention is to provide a fiber composition which is made largely of material hitherto discarded as worthless but which is particularly suitable for roofing and as a substitute for felt.

The material referred to is coir, which constitutes the husk, formed of fiber, and the pithy material of the cocoanut. It can be obtained in great quantities from various sources. This vegetable fibrous material may be chemically treated and used alone. It may also be mixed with other fibers or impregnated and mixed with various suitable compounds, according to the use to which the composition is to be put. The cocoanut fiber may be separated from the pithy material and treated alone in a manner similar to the treatment of the coir or it may be mixed and treated with various other substances, in accordance with the use to which the product is to be put.

To render the coir fireproof it is treated with a non-inflammable compound, preferably in the form of a solution, such, for example, as a solution of calcium compound in the form of lime water or bicarbonate or a solution of carbon tetrachlorid, etc. I prefer to use a clear solution of lime, with which the coir is washed or sprayed. The thin film of calcium hydroxid formed thereon is soon transformed partially or totally into a carbonate and, therefore, renders the fibers so coated immune from the attack of flames. The coir of the cocoanut is a very good heat insulator, and the coating of the husk material with a calcium compound greatly increases its heat resistance and also makes it fireproof. The coating of calcium compound on the coir material also renders it vermin-proof, thereby adapting the material for sheathing. The coir thus treated, if compressed into sheets or made into a felt surface, makes an excellent substitute for hair and rag felt heretofore used.

To increase the strength of the husk material and the toughness of the product made therefrom, the husk material is sprayed or washed with a strong saline solution or brine of common salt. This treatment of the material may be carried out previous or subsequent to the treatment of the coir with the calcium compound solution.

If desired the husk material may be mixed with any other fibers which will increase the fireproof properties of the product and produce a fabric of closer texture, this added fiber being preferably made of silica by melting 99.64% of pure silica rock and blowing the molten mass into fibrous particles by the use of compressed air. After the coir material has been treated with a solution of calcium compound or with a saline solution and the lime water, it is mixed as a semi-wet mass with the artificial silica fiber. The mixture is then felted in the usual manner. The proportions of mineral fiber and vegetable material may be varied according to the nature of the product desired.

A very excellent product is obtained by treating and saturating the coir and mineral fiber with a high-melting point, waterproof mastic compound substantially free from oil, such, for example, as gilsonite. To this compound is added powdered calcium compound, such as air-slaked lime, ground pure silica rock and mica. This raises the melting point of the waterproof compound, and the product resulting from the incorporation of said compound is made non-inflammable. This mixture of the waterproof compound, calcium compound, silica rock, and mica is also especially adapted for impregnating any kind of felt or fabric to render the same fireproof.

When fiber is separated from the pithy material of the coir, the pithy material is treated in substantially the same manner as has been described with reference to the coir, and may be used alone or with substances mentioned in connection with the coir. The pithy material can also be treated independently in the manner described with reference to the coir for making it fireproof and vermin proof, and be used alone or in combination with other substances as referred to above.

A composition made as herein described has great tensile strength, is non-expansible, non-contractible, non-inflammable, heat insulating, comparatively light and flexible, and is extremely economical to manufacture. It forms a very good substitute for hair-stock felt and is capable of various uses to which felt is usually put. It is easily compressible and, therefore, can be molded to any desired shape.

I claim:

1. Cocoanut coir coated with a fireproof solution.

2. A fiber composition, including cocoanut coir treated with a solution of a calcium compound to form a coating on the fiber which will turn into a carbonate when exposed to the atmosphere.

3. A fiber composition, including cocoanut coir which was treated with a solution of lime to form a coating thereon.

4. Cocoanut coir treated with a clear solution of lime to form a coating thereon.

5. Cocoanut coir coated with a saline and a fireproof solution.

6. A fiber composition, including cocoanut coir, coated with common salt and lime from a clear solution of lime.

7. A fiber composition, including cocoanut coir, coated with a waterproof plastic composition, including air-slaked lime, silica rock, and mica.

8. A fiber composition, including cocoanut coir, treated with a common salt solution and lime water, and mineral fiber mixed with the cocoanut coir.

9. A fiber composition comprising cocoanut coir treated with a common salt solution and lime water, and an artificial silica fiber mixed with cocoanut coir.

10. A fiber composition consisting of cocoanut coir coated with a clear solution of lime, mineral fiber mixed with the cocoanut coir, and a water and fireproof composition impregnating the coir and fiber, said compound including powdered air-slaked lime, ground silica rock, and powdered mica.

11. A fiber composition consisting of cocoanut coir treated with a clear solution of lime, mineral fiber mixed with the cocoanut coir, and a water and fireproof composition coating the coir and fibers.

12. Cocoanut fiber coated with a fireproof solution.

13. Cocoanut fiber coated with a calcium compound adapted to be converted into a carbonate by exposure to the atmosphere.

14. Cocoanut fiber treated with a clear solution of lime.

15. A vegetable fibrous material treated with a clear solution of lime.

16. A vegetable fibrous material treated with a clear solution of lime and a saline solution.

17. A fibrous material treated with a clear solution of lime.

HERMAN von UFFEL.